(12) United States Patent
Mao

(10) Patent No.: US 6,912,535 B2
(45) Date of Patent: Jun. 28, 2005

(54) SYSTEM AND METHOD FOR AUTOMATICALLY REGISTERING ARTICLES ON A DATABASE VIA NETWORKS

(75) Inventor: WenBo Mao, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 421 days.

(21) Appl. No.: 10/061,884

(22) Filed: Feb. 1, 2002

(65) Prior Publication Data

US 2003/0066024 A1 Apr. 3, 2003

(30) Foreign Application Priority Data

Sep. 20, 2001 (TW) ........................................ 90123136 A

(51) Int. Cl.[7] .............................................. G06F 17/30
(52) U.S. Cl. ........................ 707/10; 707/102; 709/223; 717/106
(58) Field of Search .................... 707/1–10, 100–104.1, 707/200–205; 709/223, 201; 717/106; 713/193

(56) References Cited

U.S. PATENT DOCUMENTS 5,862,325 A * 1/1999 Reed et al. ................. 709/201
6,658,568 B1 * 12/2003 Ginter et al. ............... 713/193

* cited by examiner

Primary Examiner—Mohammad Ali
(74) Attorney, Agent, or Firm—Wei Te Chung

(57) ABSTRACT

A system and method for automatically registering new articles on a database (110). The system automatically produces in the database a code for each article registered in the database. The system includes the database storing data on articles; at least one terminal unit (2) for exchanging data with the database via an electronic communications network (3); a searching module (160) for searching for data on articles in the database; a registering module (120) for registering new articles on the database; a checking module (130) for checking whether the data input on the database are valid; a coding rule setting module (140) for setting rules of coding articles registered in the database; and a coding module (150) for coding the new articles. The articles recorded in the database are classified into different classes of at least one level. The coding rules are set according to the classes of the new articles.

12 Claims, 5 Drawing Sheets

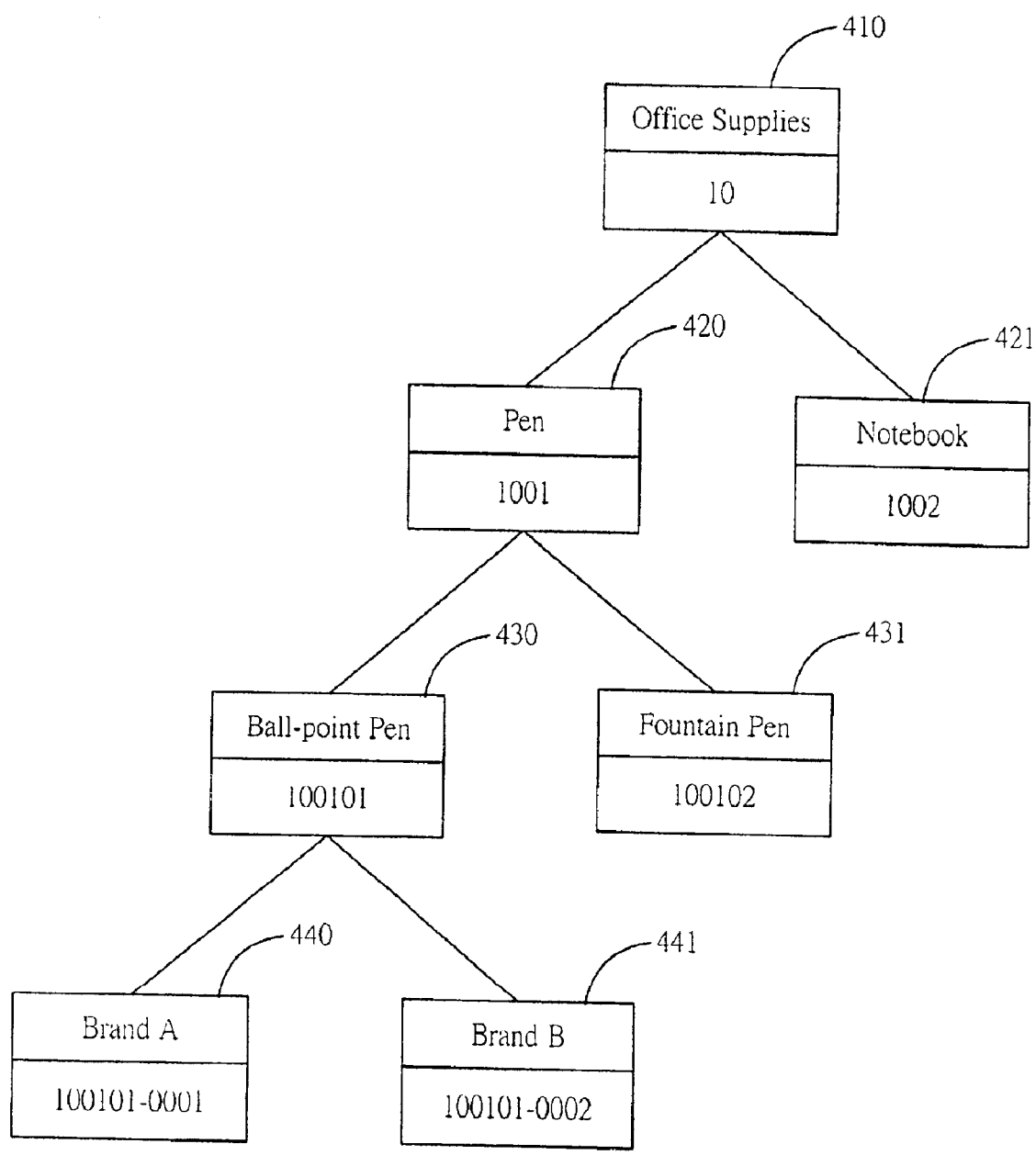
F I G. 3

| Article Code ~5a | Article Name ~5b | Brand ~5c | Unit Price ~5d | Supplier ~5e | The First Level Class ~5f | The Second Level Class ~5g | The Third Level Class ~5h |
|---|---|---|---|---|---|---|---|
| 100104-0001 | Drawing Pen | A | 1.80000 | Supplier A | Office Supplies | Pen | Drawing Pen |
| 100104-0002 | Drawing Pen | B | 2.00000 | Supplier B | Office Supplies | Pen | Drawing Pen |
| ...... | ...... | ...... | ...... | ...... | ...... | ...... | ...... |
| 100104-1000 | Drawing Pen | N | 3.00000 | Supplier N | Office Supplies | Pen | Drawing Pen |

F I G. 4

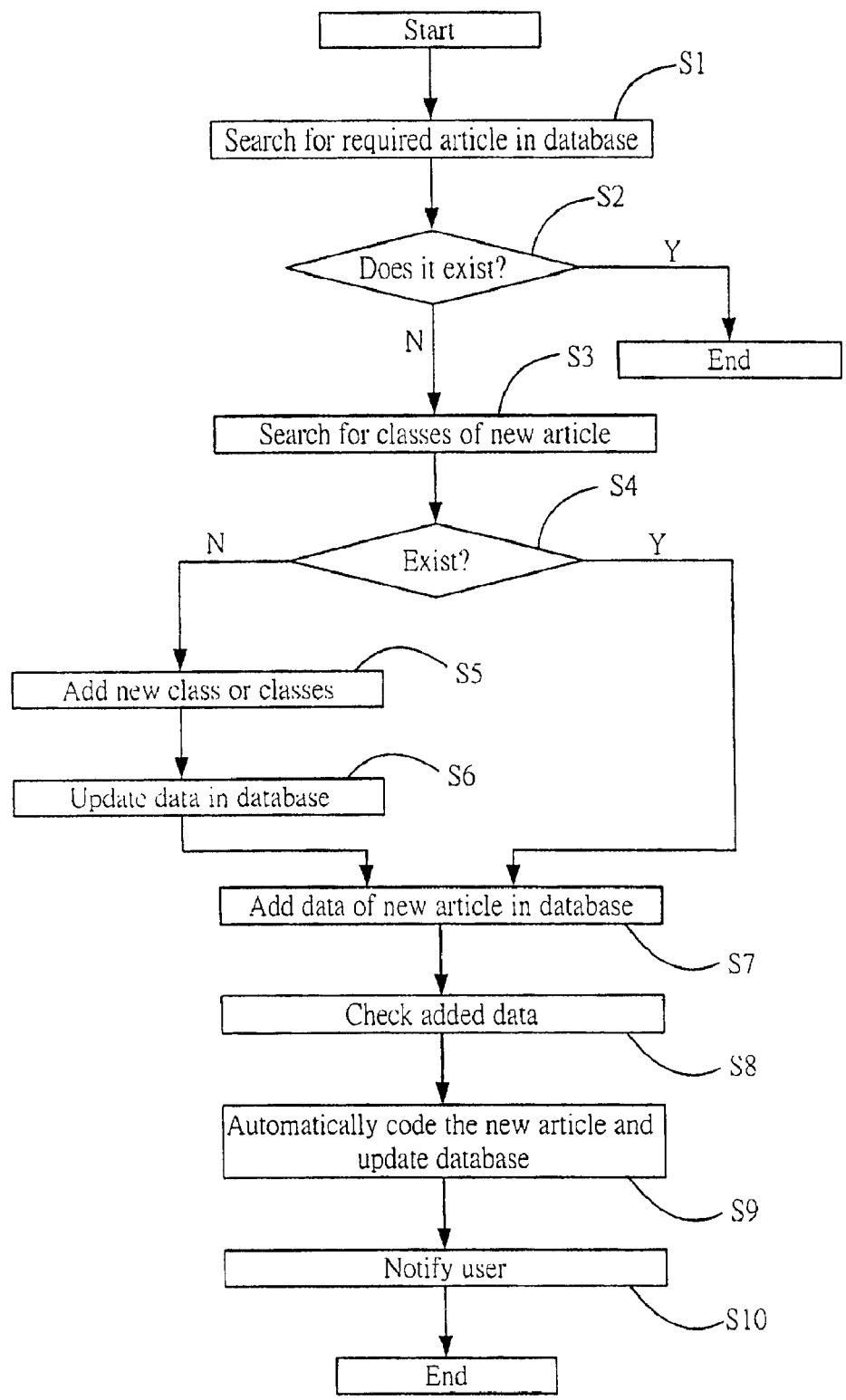
F I G. 5

SYSTEM AND METHOD FOR AUTOMATICALLY REGISTERING ARTICLES ON A DATABASE VIA NETWORKS

BACKGROUND OF THE INVENTION

1. Field of the Invention

The present invention relates to systems and methods for automatically registering new articles on a database, and more particularly to systems and methods that can automatically produce in a database a code for each article whose data are input to the database.

2. Description of the Related Art

Departments of a large organization need to purchase maintenance, repair and operating (MRO) materials such as paper, floppy disks and stationery for daily use. Normally, a central purchasing department of an organization collates total MRO material requirements of the organization periodically, by collecting purchase requisitions submitted by other departments of the organization. The purchase requisition of each department is submitted to staff of the purchasing department either in hardcopy form or by electronic means such as phone, fax, or e-mail. Generally, the purchasing department has a database for recording data on required articles. Each article recorded in the database is assigned with a unique code. Other departments can visit the database via networks and submit purchase requisitions according to the articles recorded in the database.

However, the articles recorded in the database of the purchasing department do not always cover all articles that are desired to be requisitioned. It is common for a user to be unable to find the user's required article in the database. If so, the purchasing department either refuses to accept the purchase requisition or collects data on the required article and inputs such data into the database. However, the staff in the purchasing department is often unfamiliar with the required article. Errors in inputting the data on the required articles are commonplace.

As web communications technology has advanced, more and more enterprises are beginning to conduct business on electronic networks to reduce operating costs and improve efficiency. Various departments in an organization may input data on required articles to the database of the purchasing department via such networks. However, the data stored in the database usually follows a particular format which staff members in other departments are not familiar with. Generally, each article in the database has a corresponding unique code under the said format. When staff members in other departments register new articles on the database using incorrect codes, it causes confusion and delays.

Accordingly, what is needed is a system and method that automatically produces a code for each article input by users, according to predetermined rules. What is also needed is a system and method that allows users to set rules for registering articles on a database via networks.

SUMMARY OF THE INVENTION

A primary object of the present invention is to provide a system for automatically producing in a database a code for each article whose data are input to the database according to predetermined rules.

Another object of the present invention is to provide a method for automatically producing in a database a code for each article whose data are input to the database according to predetermined rules.

In one aspect of the present invention, a system for automatically registering new articles on a database comprises a database for storing data on articles; at least one terminal unit for sending the data on the articles to or receiving the data on the articles from the database via an electronic communications network; a searching module for searching for data on articles in the database; a registering module for registering new articles on the database; a checking module for checking whether the data input by the at least one terminal unit are valid; a coding rule setting module for setting rules of coding articles registered in the database; and a coding module for coding the new articles according to the coding rules.

In another aspect of the present invention, a method for automatically registering new articles on a database comprises the steps of: classifying articles recorded in a database into different classes of at least one level; setting rules for coding a new article via a coding rule setting module; selecting at least one class in the database for the new article; and automatically coding the new article according to the coding rules and the at least one class of the new article. When an appropriate classes of the new article does not exist in the database, the method further comprises the step of: adding at least one new class for the new article into the database. These and other objects, features, and advantages of the present invention will become more fully apparent from the following description and appended claims, or may be learned by practice of the invention as set forth hereinafter.

BRIEF DESCRIPTION OF THE DRAWINGS

FIG. 3 is a schematic diagram showing an exemplary coding rule hierarchy according to the preferred embodiment of the present invention;

FIG. 4 is a table showing detailed information on articles registered in a database in the central process unit of the article registering system of FIG. 1; and FIG. 5 is an operation flowchart of the article registering system of FIG. 1.

DETAILED DESCRIPTION OF THE INVENTION

Figure 1:
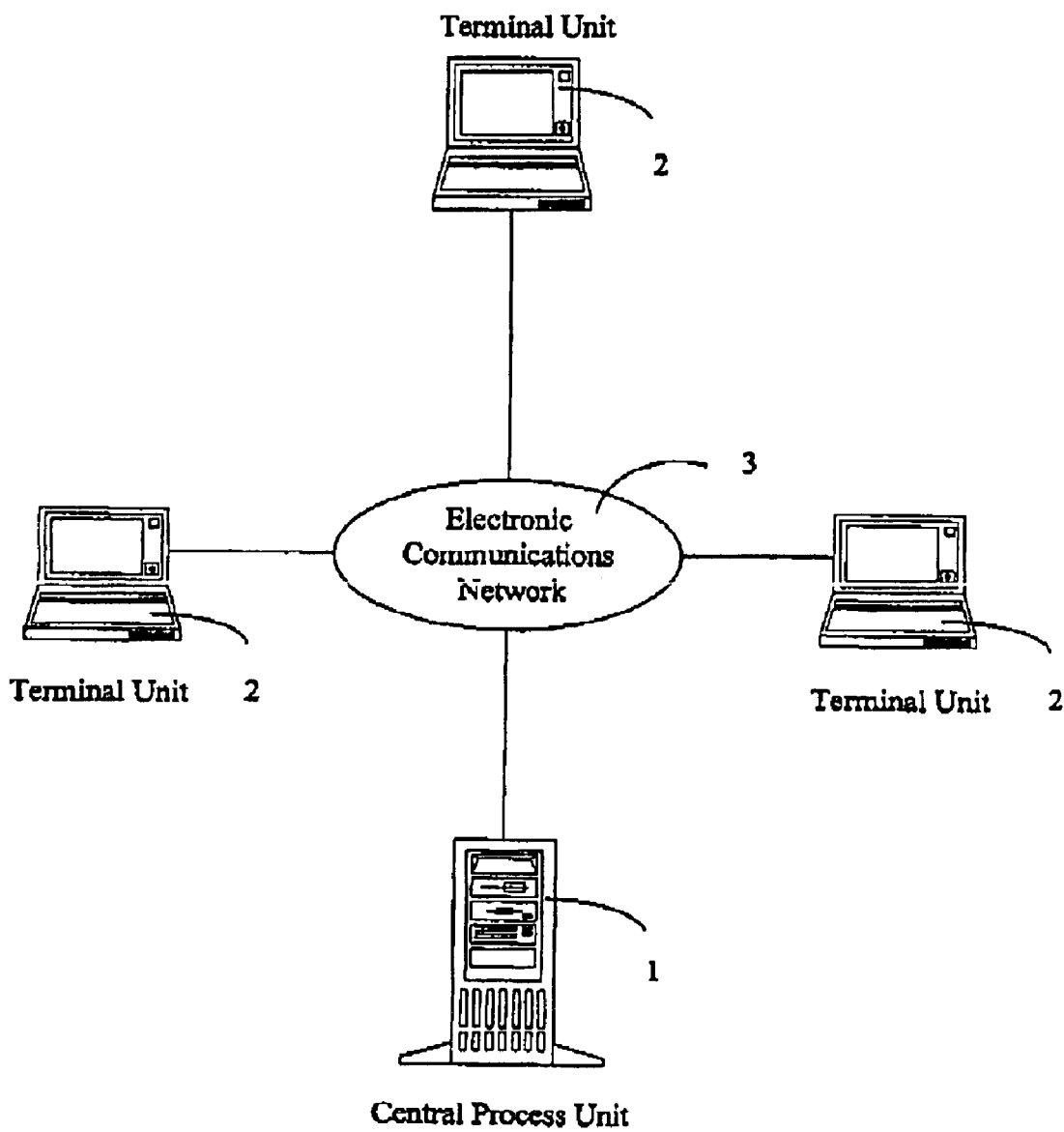
FIG. 1 is a schematic diagram of a framework of an article registering system according to a preferred embodiment of the present invention.

Reference will now be made to the drawing figures to describe the present invention in detail.

FIG. 1 is a schematic diagram of a framework of an article registering system according to a preferred embodiment of the present invention. The article registering system comprises a plurality of terminal units 2 provided to users for inputting and retrieving data, a central process unit 1 for receiving and processing data input at the terminal units 2, and an electronic communications network 3 for transferring information between the central process unit 1 and the terminal units 2.

The terminal units 2 can be personal computers, scanners, facsimile machines, and the like which send and receive messages via the electronic communications network 3 and via other networks. The electronic communications network 3 can be an Ethernet, an intranet or the Internet. The central process unit 1 can be a personal computer or a workstation at which an employee can send data to or receive data from any terminal unit 2.

Each terminal unit 2 inputs data to the central process unit 1 via the electronic communications network 3. The central process unit 1 receives and processes the data input by the terminal unit 2. The processed data are fed back to the inputting terminal unit 2 via the electronic communications network 3. If authorized, the terminal unit 2 can retrieve and print the data stored in the central process unit 1.

Figure 2:
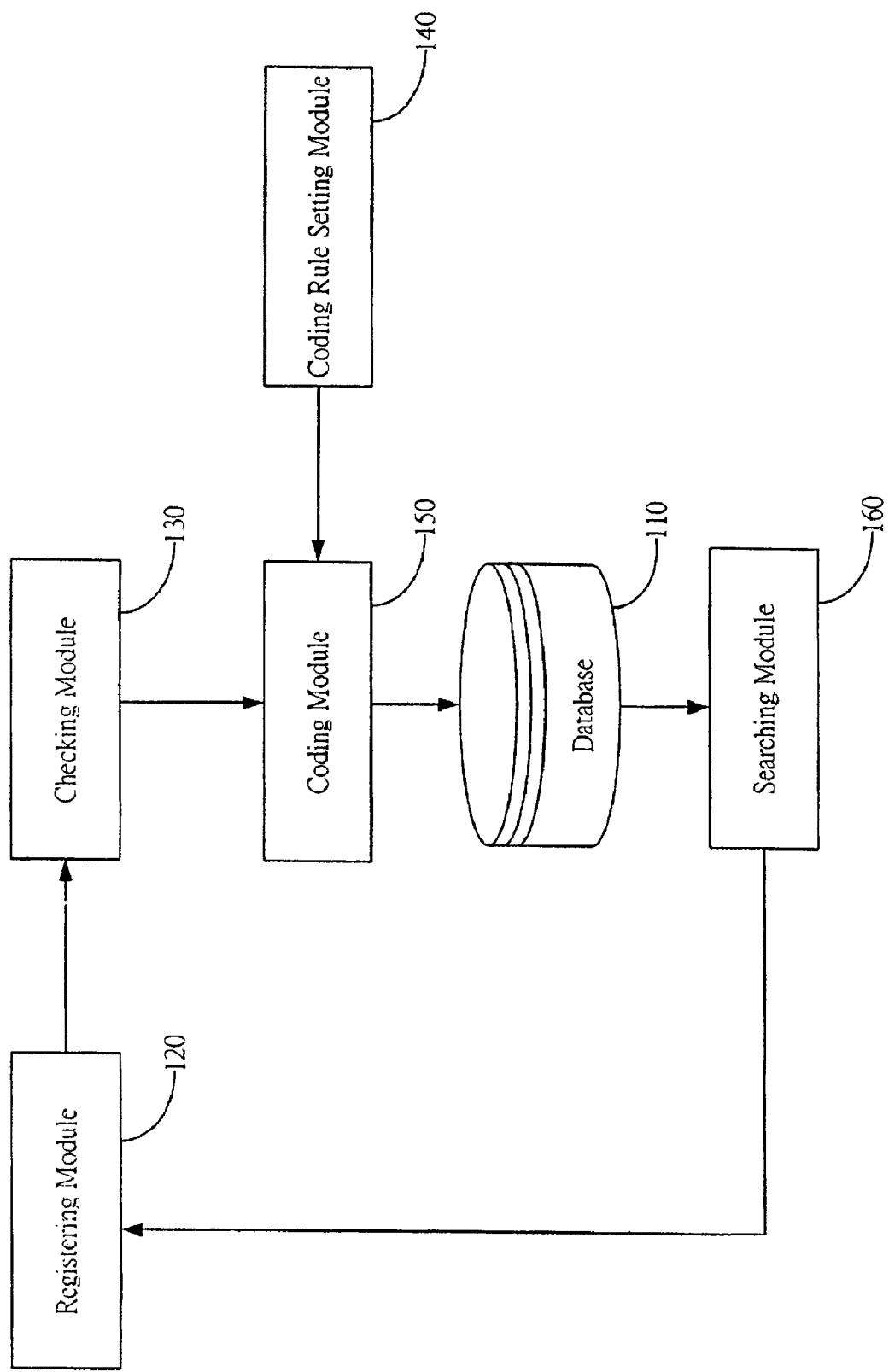
FIG. 2 is a schematic diagram of a central process unit of the article registering system of FIG. 1.

FIG. 2 is a schematic diagram of the central process unit 1 of the article registering system. The central process unit 1 comprises a database 110 for storing data on articles, a registering module 120 for registering new articles on the database 110, a checking module 130 for checking whether the data input by the terminal unit 2 are valid in the database 110, a coding rule setting module. 140 for setting rules for coding articles, a coding module 150 for coding the newly registered articles, and a searching module 160 for searching for data on the articles stored in the database 110.

When a user registers a new article on the database 110, the user first inputs detailed data on the article via the registering module 120, whereupon the checking module 130 automatically checks the input data to see if the input data are valid. If valid, the coding module 150 codes the newly registered article according to coding rules set by the coding rule setting module 140. The coding rules are described in detail below with reference to FIG. 3, and the entire process of article registering is described in detail below with reference to FIG. 5.

FIG. 3 is a schematic diagram showing an exemplary coding rule hierarchy according to the preferred embodiment of the present invention. The articles registered on the database 110 are classified according to usage, category, brand, and so on. A typical article registered on the database 110 is classified into three classes, one class being in each of three levels of classes. For example, for a ball-point pen, the first level class is 'office supplies,' the second level class is 'pen,' and the third level class is 'ball-point pen.' In FIG. 3, 'office supplies' 410 is one of the first level classes and coded with the number '10.' Other classes, such as 'computer' and 'production material,' are also classified as first level classes and similarly coded with the numbers '20,' '30' (not shown in FIG. 3). 'Pen' 420 is one of the second level classes, which are subclasses of the first level 'office supplies' 410 class. A code of each second level class must show the first level class to which the second level class belongs. Therefore, 'pen' 420 is coded with the number '1001,' in which '10' represents the first level 'office supplies' 410 class. Other classes, such as 'notebook' 421, 'folder' (not shown), are also classified as second level classes which are subclasses of the first level 'office supplies' 410 class. 'Ball-point pen' 430 is one of the third level classes which are subclasses of the second level 'pen' 420 class. A code of each third level class must show the first level class and the second level class to which the third level class belongs. Consequently, 'ball-point pen' 430 is coded with the number '100101,' in which '1001' represents the first level 'office supplies' 410 class and the second level 'pen' 420 class. Other classes, such as 'fountain pen' 431 which is coded with the number '100102,' are classified as third level classes which are subclasses of both the second level 'pen' 420 class and the first level 'office supplies' 410 class. In addition, 'ball-point pen' 430 may have still further subclasses which can be distinguished by four additional numbers. For example, 'ball-point pen' 430 may be further classified according to brand. Therefore, 'ball-point pen' 430 of 'brand A' 440 is coded with the number '100101-0001.' Similarly, 'ball-point pen' 430 of 'brand B' 441 is coded with the number '100101-0002.'

FIG. 4 is a table showing detailed information on articles registered in the database 110. The table records basic information and class information of each article. The basic information includes article code 5a, article name 5b, brand 5c, unit price 5d, and supplier 5e. The class information includes first level class 5f, second level class 5g and third level class 5h. As shown, an article named drawing pen has a code '100104-0001,' a brand 'A,' a unit price '1.80000,' a supplier 'supplier A,' a first level 'office supplies' class, a second level 'pen' class, and a third level 'drawing pen' class. The code of each article is determined according to its class(es).

FIG. 5 is an operation flowchart of the article registering system. In step S1, a user first inputs search requirements about a required article to the central process unit 1 via one of the terminal units 2 (see FIGS. 1, 2). In step S2, the searching module 160 in the central process unit 1 receives the search requirements input by the user via the electronic communications network 3, and searches for the user's required article in the database 110 (see FIGS. 1, 2). If the required article exists in the database 110, the operation is ended. If the required article does not exist in the database 110, the required article is hereinafter referred to as a new article. In step S3, the user searches the database 110 for the classes of the new article via the terminal unit 2. The classes include the first level class, the second level class and the third level class. In step S4, the searching module 160 checks the database 110 to see if the classes of the new article exist. If the classes of the new article exist, the operation directly proceeds to step S7 (see below). If the classes of the new article do not exist, then in step S5, new classes of the new article are added into the database 110. The added classes may include up to three classes respectively in the three different levels of classes. For example, if the first level class already exists in the database 110, then a second level class and a third level class are added into the database 110. Similarly, if both the first and second level classes already exist in the database 110, then a third level class is added into the database 110. In step S6, the database 110 is updated. New classes are recorded in the database 110 so that any user can directly register new articles according to the classes in the database 110. In step S7, detailed data on the new article are added into the database 110 according to the classes of the new article. The detailed data include the new article's name, brand, unit price, and supplier. In step S8, the checking module 130 in the central process unit 1 automatically checks the data of the new article (see FIG. 2). If the data input by the user are invalid, the checking module 130 sends a message showing the reasons for invalidity to the user via the electronic communications network 3. The user then modifies the invalid data according to instructions provided by the checking module 130. If the data input by the user are valid, then in step S9, the coding module 150 in the central process unit 1 automatically codes the new article according to the coding rules set in the coding rule setting module 140. The code of the new article shows the new article's classes in all three levels. The database 110 is updated to include the data of the new article. In step S10, a message is sent to the user from the central process unit 1 to advise successful registration of the new article.

The preferred embodiment described herein is merely illustrative of the principles of the present invention. Other arrangements and advantages may be devised by those skilled in the art without departing from the spirit and scope of the present invention. Accordingly, the present invention should not be deemed to be limited to the above detailed description, but rather by the spirit and scope of the claims which follow and their equivalents.

What is claimed is:

1. A system for automatically registering new articles on a database via at least one network, the system comprising:
   a database for storing data on articles;
   at least one terminal unit for sending the data on the articles to or receiving the data on the articles from the database via an electronic communications network;
   a searching module for searching for data on articles in the database;
   a registering module for registering new articles in the database;
   a checking module for checking whether the data input by the at least one terminal unit are valid;
   a coding rule setting module for setting rules of coding articles registered in the database; and
   a coding module for automatically coding the new articles.

2. A method for automatically registering new articles in a database via at least one network, the method comprising the steps of:
   classifying articles recorded in a database into different classes of at least one level;
   setting rules for coding a new article via a coding rule setting module;
   selecting at least one class in the database for the new article; and
   automatically coding the new article according to the coding rules and the at least one class of the new article.

3. The method as claimed in claim 2, wherein the rules for coding the new article are set according to the at least one class of the new article.

4. The method as claimed in claim 2, further comprising the step of:
   inputting detailed data on the new article to the database.

5. The method as claimed in claim 4, wherein the detailed data comprise the article's name, brand, unit price, and supplier.

6. The method as claimed in claim 2, further comprising the step of:
   storing the code and the detailed data of the new article in the database.

7. A method for automatically registering new articles in a database via at least one network, the method comprising the steps of:
   classifying articles recorded in a database into different classes of at least one level;
   setting rules for coding a new article via a coding rule setting module;
   adding at least one new class of the new article into the database; and
   automatically coding the new article according to the coding rules and the at least one new class of the new article.

8. The method as claimed in claim 7, wherein the rules for coding a new article are set according to the at least one new class of the new article.

9. The method as claimed in claim 7, further comprising the step of:
   inputting detailed data on the new article to the database.

10. The method as claimed in claim 9, wherein the detailed data comprise the article's name, brand, unit price, and supplier.

11. The method as claimed in claim 7, further comprising the step of:
    storing the code, the detailed data and all classes of the new article in the database.

12. A process of applying for a specific article for a user, comprising the steps of:
    checking if said article is already listed in the database;
    searching for a class of said article in said database if said article is a new one and not listed in the database, or directly applying for said article if said article is an old one and already listed in the database;
    adding a new class into the database and accordingly updating said database and adding datum of said new article in the database if said class is not listed in the database, or directly adding datum of said new article if said class is already listed in the database;
    checking said added datum;
    automatically coding the new article and updating the database; and
    notifying the user to allow said user to apply for said article accordingly.

* * * * *